Sept. 15, 1931.  S. H. CALDWELL  1,823,028
JOINT AND METHOD OF MAKING THE SAME
Filed Aug. 9, 1927
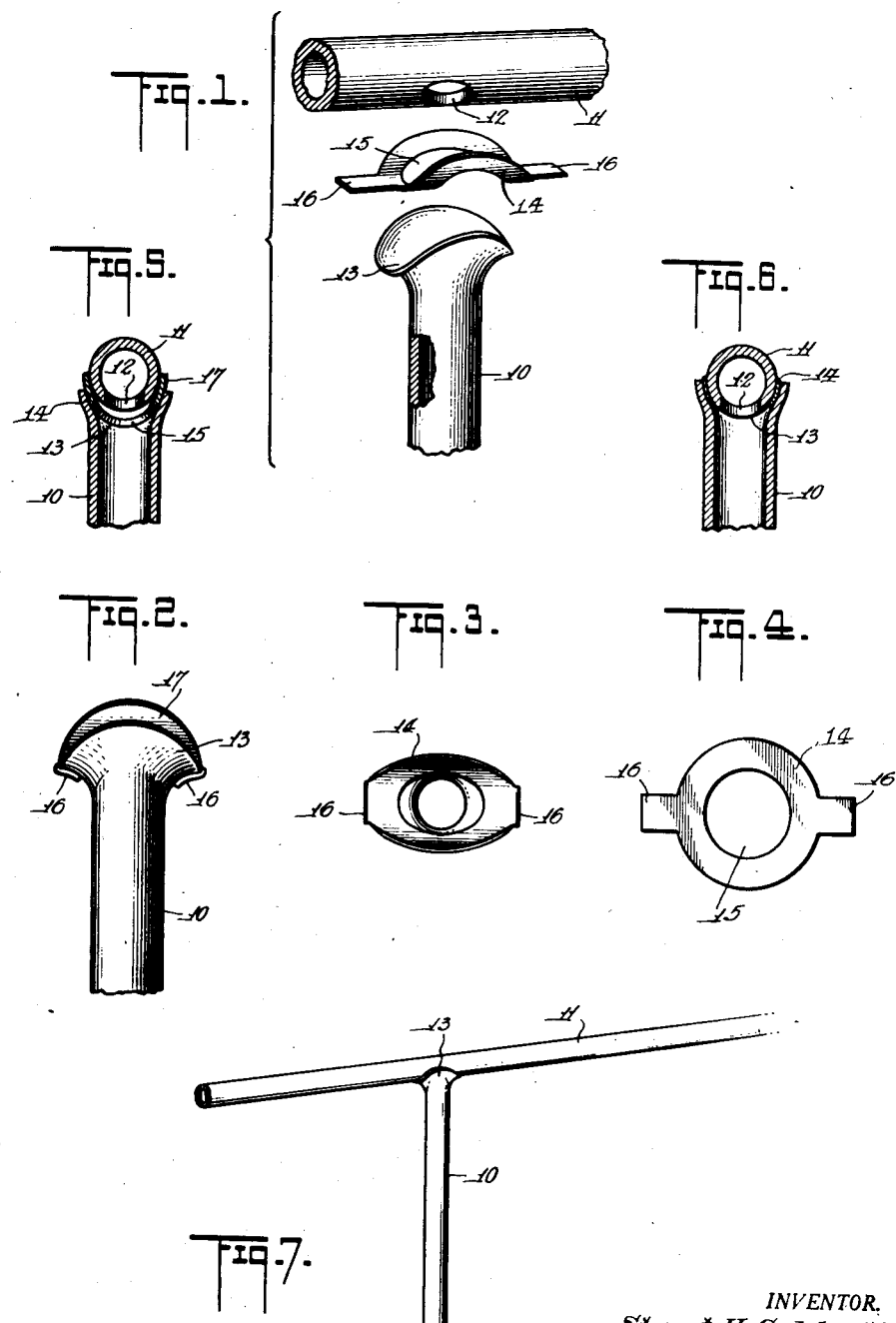
INVENTOR.
Stuart H. Caldwell.
BY
his ATTORNEYS.

Patented Sept. 15, 1931

1,823,028

UNITED STATES PATENT OFFICE

STUART H. CALDWELL, OF DETROIT, MICHIGAN, ASSIGNOR TO AUTO RESEARCH CORPORATION, A CORPORATION OF DELAWARE

JOINT AND METHOD OF MAKING THE SAME

Application filed August 9, 1927. Serial No. 211,654.

My present invention is shown embodied in a specific method, and the consequent product, of uniting two lengths of metal pipe with each other in angular or T relation, by the use of fusible bonding metal.

The invention is more particularly useful in the assembly of distributing systems, composed of small-bore piping such as are employed in central lubricating systems of the type shown in Bijur Patent No. 1,632,771, of June 14, 1927, the bores of the constituent pipe lengths of which would be apt to become partly obstructed with the bonding medium, if directly connected in liquid-tight relation by ordinary methods.

It is, accordingly, a specific object of the invention to provide a simple and expeditious method, requiring no high order of skill for execution thereof, for making a secure liquid-tight T union between two pieces of small-bore pipe, which method dispenses with the use of a distinct T or other connecting fitting, and yet avoids the constriction or obstruction of the pipe bore, by the flow and congelation of the fused bonding material thereinto.

Another object is to make a permanent secure joint of the character referred to, in which the uniform distribution of the right amount of bonding material over the junction surfaces to be connected, is assured and such excess is avoided as might spread and congeal over the exterior of the parts, to cause an unsightly finish.

The invention in its broader aspects is by no means limited to the bonding of pipe or tube elements, but is useful for the connection of other parts, and especially where structures are to be directly joined without the use of intervening fittings, and where it is important or desirable to avoid the spread of fused bonding metal, and yet to assure a tight joint.

According to my method, a piece, preferably a washer of fusible metal and of correct volume to form the joint is fused and allowed to congeal, between the junction surfaces of the two or more elements to be connected. Preferably the washer is pre-shaped to adapt itself to the curvature or other conformation of the complementary junction surfaces of the elements to be bonded, and is fused while the junction surfaces are held or pressed together. The washer may first be mechanically affixed to one of the elements to be joined, so that no shifting thereof occurs during the bonding operation.

In a specific application for making T joint connections of pipes, the washer is conformed to the cylindrically flared end of one of the pipes and has end tabs turned over the extremities of said cylindrical flare. The aperture in the wall of the cross pipe is brought into correct relation with respect to the stem and the washer is fused, while the pipe parts are held or pressed together against the intervening bonding medium.

In the accompanying drawings, in which a preferred one of various possible embodiments of the several features of the invention is shown applied for making T joints, Fig. 1 is a dropped perspective view indicating the constituent elements making up the joint prior to connection thereof, Fig. 2 is a side elevation of the stem with the brazing washer in position thereon, Fig. 3 is a top view of the elements shown in Fig. 2, Fig. 4 is a plan view of the brazing washer prior to shaping thereof, Fig. 5 is a view in longitudinal section showing the relation of the constituent parts immediately prior to application of the fusing heat, Fig. 6 is a similar view showing the relation of the parts in the finished joint, and Fig. 7 is a plan view on a smaller scale of a T joint according to my invention.

Referring now to the drawings, I have shown two small-bore pipes 10 and 11 to constitute respectively the stem and the cross bar of a T connection therebetween, the wall of the latter pipe having an aperture 12 therein for communication with the stem. The end of stem 10 is flared in the usual manner, as shown, to afford a cylindrical saddle 13 for accommodating the cross-pipe 11. A washer 14 of fusible bonding material, preferably brass, of predetermined volume, is interposed as shown in Figs. 1 and 5 between the saddle 13 and the pipe 11.

The washer is preferably an annular stamping having a central opening 15 of diameter materially larger than that of the bore of pipe 10. The bonding washer 14 is curved along one diameter thereof, as best shown in Figs. 1 and 3, for adaptation at its convex side to the saddle 13 of the flared pipe stem end and to lodge the cross pipe 11 in its concave face.

The washer preferably has tabs 16 at the ends of the axis of curvature thereof, which tabs are turned over the ends of the stem saddle 13, so as to position the washer correctly preparatory to brazing. As best shown in Fig. 2, the washer 14 is of diameter substantially equal to the length of the flared saddle 13, so that the lateral edges of the washer extend as segments 17 beyond the sides of the pipe flare 13, while the ends of the saddle come substantially flush with the washer, only the turned-over tabs 16 of which extend therebeyond.

For executing the method, the brazing washer after having been dipped into appropriate flux, is laid into the saddle 13 of the pipe stem and positioned by turning the end tabs 16 over the ends of the saddle. The cross bar 11 is then laid into the brazing washer, which is thus interposed between the junction surfaces of the parts. The aperture 12 being correctly registered with respect to the washer 14, the parts are held or pressed together. When the brazing torch is now applied, the washer being directly subjected to the heat thereof, promptly fuses, to permanently connect the parts together.

As best shown in Fig. 5, the washer 14 is of original thickness somewhat greater than in the finished joint. Thus, while the saddle, which is conformed for adaptation to the cross pipe, snugly accommodates the shaped washer 14, the cross pipe 11, as best shown in Fig. 5 contacts the latter near the rim thereof, and is spaced therefrom about aperture 12. The washer when fused, flows, as the cross pipe 11 is pressed toward the pipe saddle, until in the finished congealed joint, best shown in Fig. 6, the brazing material forms a bond in the order of .005" in thickness. The original aperture 15 in the washer 14 being materially larger than the pipe bore, the fused brass will not flow inward sufficiently to reach or obstruct bore 10. The laterally projecting segments 17 of the washer and the end tabs 16 will fuse in place adjacent the rim of the saddle 13 enhancing the security of the joint, without providing any excess that would disfigure the finish thereof or make necessary a distinct finishing operation. A neat, liquid-tight joint or bond is thus produced.

The invention is, of course, applicable to the use of fusible bonding means other than brass, for instance, to solder and to the connection of two, three or more pieces of various shapes, having junction surfaces of more or less complementary conformations.

If the bonding washer is sufficiently thin or yielding, it need not be preshaped, but may be conformed to the curvature of the complementary junction surfaces to be bonded, by the pressure of said parts against the washer when interposed in the flat form thereof shown in Fig. 4.

If desired, the brazing or other bonding material may be formed in a blank embodying the flux in the structure thereof.

I claim:—

1. The method of attaching a piece to the end of a tube, which consists in flaring said tube end to conform to the shape of said piece, mechanically affixing to said flared end a fusible washer, of volume to make the joint, fusing said washer and retaining said tube and said piece in engagement with said fused metal while the latter congeals.

2. The method of brazing the end of a pipe of small diameter to another piece, which consists in flaring said end to a form complementary to the corresponding part of said piece, superposing over said flared end an annular brass washer of fusible metal conformed to the shape of said flare, turning over the ends of said washer to retain it in accurate position upon said flare and then fusing said washer with said piece in position against said pipe end.

3. The method of brazing the end of a small diameter stem to a cross pipe to form a T joint, which consists in flaring said end to a form complementary to the corresponding part of the cross piece, superposing over said flared end an annular brass washer of fusible material, conformed to the shape of said flare and of volume sufficient to form the joint, turning over the ends of said washer to retain it in accurate position upon said flare and then fusing said washer while pressing said stem pipe and said cross pipe together.

4. As an article of manufacture, a small bore pipe stem prepared for permanent communicating attachment with a complementary pipe at an angle thereto, said stem having a cylindrically flared end and a perforated blank of fusible metal lodged at said flared end and conformed with respect thereto and having protruding tongues turned over the extremities of said flared end to position the same.

5. As an article of manufacture, a small bore pipe stem prepared for permanent communicating attachment with a complementary pipe at an angle thereto, said stem having a cylindrically flared end and a perforated blank of fusible metal lodged at said flared end and conformed with respect thereto and having protruding tongues turned over the ends of said flare to position the same, the lateral edges of said washer protruding beyond the edge of the flared end and the central aperture of said washer being of diameter larger than the bore of said pipe.

6. As an article of manufacture, a pipe having a cylindrically flared flange at its end and a washer of fusible metal positioned in said flange with its edges bent over the lip of the flange to affix said washer to said flange.

7. As an article of manufacture, a pipe having a cylindrically flared flange at its end and a washer of fusible metal positioned in said flange, said washer having a plurality of backwardly bent tabs embracing the lip of the flange to secure said washer to said flange.

8. As an article of manufacture, a solder blank for angularly arranged pipe joints or the like comprising a washer of fusible material, said washer having a plurality of circumferentially positioned bendable tabs to grip one of said pipes to retain the washer in position thereon prior to fusion.

Signed at Detroit, in the county of Wayne and State of Michigan, this 6th day of August, A. D. 1927.

STUART H. CALDWELL.